United States Patent [19]
Rioux et al.

[11] Patent Number: 5,946,645
[45] Date of Patent: Aug. 31, 1999

[54] THREE DIMENSIONAL IMAGING METHOD AND DEVICE

[75] Inventors: Marc Rioux, Ottawa; Patrick Hébert, Hull, both of Canada

[73] Assignee: National Research Council of Canada, Ottawa, Canada

[21] Appl. No.: 08/831,615

[22] Filed: Apr. 9, 1997

[51] Int. Cl.$^6$ ............................... G06T 17/00; G06T 1/00
[52] U.S. Cl. ......................... 702/155; 382/294; 702/152; 702/153
[58] Field of Search ..................................... 702/159, 167, 702/166, 94, 95, 150, 152, 153, 155; 250/559.31, 559.23, 559.22; 382/106, 108, 153, 276, 294; 356/376, 2, 375, 398, 4.01, 385, 386, 387

[56] References Cited

U.S. PATENT DOCUMENTS

| | | | |
|---|---|---|---|
| 4,627,734 | 12/1986 | Rioux | 364/572 |
| 4,658,368 | 4/1987 | Blais | 356/376 |
| 5,018,854 | 5/1991 | Rioux | 356/376 |
| 5,177,516 | 1/1993 | Rioux | 356/73 |
| 5,422,828 | 6/1995 | Choate et al. | 364/516 |
| 5,471,541 | 11/1995 | Burtnyk et al. | 382/153 |
| 5,531,520 | 7/1996 | Grimson et al. | 382/131 |
| 5,701,173 | 12/1997 | Rioux | 356/73 |

OTHER PUBLICATIONS

Hebert et al., "Toward a hand–held laser range scanner: integrating observation–based motion compensation", IEEE, Abstract only, 1998.
Gagnon et al., "A compuer–assisted Range Image Registration System for Nuclear Waste Cleanup", IEEE, Aug. 1996.
Smith et al., "Accurate Structure and Motion Computation in the Presence of Range Image Distortions due to Sequential Acquisition", IEEE, 1994.
Beraldin et al., "Portable Digital 3–d Imaging System for Remote Sites", IEEE, Mar. 1998.
Rioux, M., "Laser Range Finder Based on Synchronized Scanners", published in Applied Optics, vol. 23, No. 21, pp. 3837–3844, Nov. 1, 1984.
Rioux, M. et al., "Compact Three–Dimensional Camera for Robotic Applications", published in Journal of the Optical Society of America, vol. 3, p. 1518, Sep. 1986.
Rioux, M. et al., "Range Imaging Sensors Development at NRC Laboratories", published in Proceedings of the Workshop on Interpretation of 3D Scenes, Austin, Texas, Nov. 27–29, 1989.
Fisher, R.B. et al., "A Hand–Held Optical Surface Scanner for Environmental Modeling and Virtual Reality", presented at the Virtual Reality World '96 Conference in Stuttgart, Germany, Feb. 13–15, 1996.
Kamgar–Parsi, B. et al., "Registration of Multiple Overlapping Range Images: Scenes Without Distinctive Features", published in IEEE Transactions on Pattern Analysis and Machine Intelligence, vol. 13, No. 9, pp. 857–871, Sep. 1991.
"Numerical Recipes in C: The Art of Scientific Computing", Cambridge University Press, Second Edition, 1992.

*Primary Examiner*—Patrick Assouad

[57] ABSTRACT

A three dimensional imaging method and device including a ranging sensor that is used to produce a series of profiles of a target surface. The profiles comprise one set of profiles nearly parallel to each other and a further such set of nearly parallel profiles, with the profiles of one set extending at an angle to those of the other set to generate a large number of profile crossings. At the location of each crossing the shortest distance between the profiles is detected and represents an energy contribution between this pair of profiles. An energy function is defined as the sum of the energy contributions of all the crossings. Using a known mathematical model, the profiles are then reoriented relative to each other in such a manner as to minimise this total energy. This process can be repeated for higher precision. The finally reoriented profiles can be used to define the desired three-dimensional shape of the target surface.

21 Claims, 6 Drawing Sheets

THREE DIMENSIONAL IMAGING METHOD AND DEVICE

FIELD OF THE INVENTION

This invention relates to the field of three dimensional imaging systems, and more particularly to a method and apparatus of determining spatial relationships of sets of range measurements obtained from a target surface. In a preferred embodiment, the present invention provides a method for ascertaining the three-dimensional shape of a target surface using a ranging sensor to obtain a plurality of overlapping profiles.

BACKGROUND OF THE INVENTION AND PRIOR ART

Numerous examples of optical ranging systems have been proposed by workers in the art, and reference can be made to a basic triangulation system disclosed in U.S. Pat. No. 4,627,734 issued Dec. 9, 1986 to Marc Rioux. Further explanation of the theory behind this system and some practical applications are provided by "Laser range finder based on synchronized scanners" by M. Rioux, published in Applied Optics, Vol. 23, No. 21, pp 3837–3844, Nov. 1, 1984.

An alternative ranging system is disclosed in "Compact three-dimensional camera for robotic applications" by M. Rioux et al., published in Journal of the Optical Society of America, Vol. 3, page 1518, September 1986; and many of the practical applications of the various different types of ranging systems are set out in "Range Imaging Sensors Development at NRC Laboratories" by M. Rioux et al., published in Proceedings of the Workshop on Interpretation of 3D Scenes, Austin, Tex., Nov. 27–29, 1989.

With the explosive development of virtual reality and the need for environment modelling facilities, optical surface scanners are becoming extremely useful tools. These sensors can provide precise surface shape as well as surface color in some cases. However, most of the currently existing scanners are bulky, or have been devised for fixed-mount or tracking arm operation. The current motivation is to make a compact hand-held sensor technology widely available.

Although laser sensors based on sequential scanning can provide good precision measurements in stable operation, the recovered surface becomes noisy and distorted when there is camera motion due, for example, to an insufficiently rigid mount or to involuntary hand motion when the camera is hand-held. To compensate for camera motion, the current existing prototypes integrate a global positioning system, instruments or restrictive assumptions on the observed shape. See, for example, "A hand-held optical surface scanner for environmental modeling and virtual reality" by R. B. Fisher et al., presented at the Virtual Reality World '96 Conference in Stuttgart, Germany, Feb. 13–15, 1996; and "Registration of Multiple Overlapping Range Images: Scenes without Distinctive Features" by K-P. Bohroog et al., published in IEEE Transactions on Pattern Analysis and Machine Intelligence, Vol. 13, No. 9, pp. 857–871, September 1991, which used stripped images. Unfortunately, these solutions to the problem have not proved sufficiently precise and appropriate for general applications. Moreover, hardware complexity may increase.

SUMMARY OF THE INVENTION

An object of the present invention is to improve the image results of prior art three dimensional imaging processes and systems.

Another object of the present invention is to provide a method of determining the spatial relationships of sets of range measurements obtained from a target surface.

An object of the preferred form of the present invention is to provide a method for ascertaining the three-dimensional shape of a target surface using a ranging sensor to obtain a plurality of overlapping profiles.

In accordance with the present invention there is provided a method of determining spatial relationships of sets of range measurements obtained from a target surface, comprising: (a) producing a set of profiles of the target surface using a ranging sensor with at least a subset of the set of profiles crossing each other; (b) detecting at the location of a crossing of two profiles the shortest distance between these profiles, such distance being a measure of an energy contribution between this pair of profiles; (c) summing the energy contributions of a plurality of such crossing locations to generate an energy function; and (d) reorienting the profiles relative to each other to minimise the energy function.

In accordance with another aspect of the present invention there is provided a method of ascertaining the three-dimensional shape of a target surface, comprising (a) using a ranging sensor to produce a series of profiles of the surface with some of the profiles crossing over others of the profiles; (b) detecting at the location of a crossing of two profiles the shortest distance between these profiles, such distance being a measure of an energy contribution between this pair of profiles; (c) summing the energy contributions of a plurality of such crossing locations to generate an energy function; and (d) reorienting the profiles relative to each other to minimise the energy function, the reoriented profiles together defining the three-dimensional shape of the surface.

More specifically, the invention involves using a ranging sensor to produce a series of profiles of the surface, with some of the profiles crossing over others. In the preferred embodiment, two sets of profiles are used. Each set contains a number of profiles that are substantially parallel to each other, the profiles of one set extending at an angle to the profiles of the other set. This angle can conveniently be approximately 90°, but need not be. Alternatively, there can be more than two crossing sets, or the profiles can extend in random directions over the surface, provided that there are at least some crossings and preferably a large number of such crossings. Two profiles are said to cross if their scanning planes intersect, but the profiles themselves do not necessarily directly intersect.

Each profile is obtained in such a short time that distortion due to movement of the ranging sensor is negligible, so that each profile is considered to be a rigid entity. However, inter-profile positioning is subject to perturbations due to relative movement between the ranging device and the target surface.

The invention overcomes this latter difficulty by detecting at the location of a crossing of two profiles the shortest distance between these profiles. This distance is a measure of an energy contribution to a so-called energy function (also referred to as the objective function).

Specifically, the energy contribution of two crossing profiles can ideally be taken as proportional to the square of such distance, although the present invention does not exclude the use of other relationships (such as L1-norm).

The energy function is the sum of the energy contributions determined for each of a plurality of the crossing locations, preferably for a large number of such crossing locations. The profiles are then reoriented relative to each other in such a manner as to minimise the energy function, i.e. as far as possible to fit the profiles together so that they now not only cross one another but also intersect one another.

As will be explained below, mathematical methods are available for carrying out this reorientation process. It may be necessary to carry out this process more than once, i.e. reassessing the energy function a second time after carrying out a first reorientation and performing the profile reorientation a second time based on this reassessed energy function. Reassessment and reorientation can be repeated as many times as necessary, with usually some improvement in precision each time, although the majority of the improvement is typically achieved by the first reorientation, so that in some cases no repeated reassessment and reorientation is required. The finally reoriented profiles can be used to define the three-dimensional shape of the surface.

The invention also relates to apparatus for carrying out this method. In accordance with another aspect of the present invention there is provided an apparatus for ascertaining characteristics of a target surface, comprising (a) at least one ranging sensor for producing a series of profiles of the target surface; and (b) means for: (i) detecting at the location of a crossing of two said profiles the shortest distance between these profiles, (ii) determining from this distance an energy contribution between this pair of profiles, (iii) summing the energy contributions of a plurality of such crossing locations to generate an energy function, and (iv) reorienting the profiles relative to each other to minimise the energy function.

In a preferred embodiment a ranging sensor is incorporated into a hand held camera that is capable of producing quality three dimensional reproductions taking into account the inherent instability in the human hand and arm.

DETAILED DESCRIPTION OF THE DRAWINGS

Embodiments of the present invention will be described therein below in conjunction with the following drawings in which.

DETAILED DESCRIPTION OF PREFERRED EMBODIMENTS OF THE PRESENT INVENTION

Figure 1:
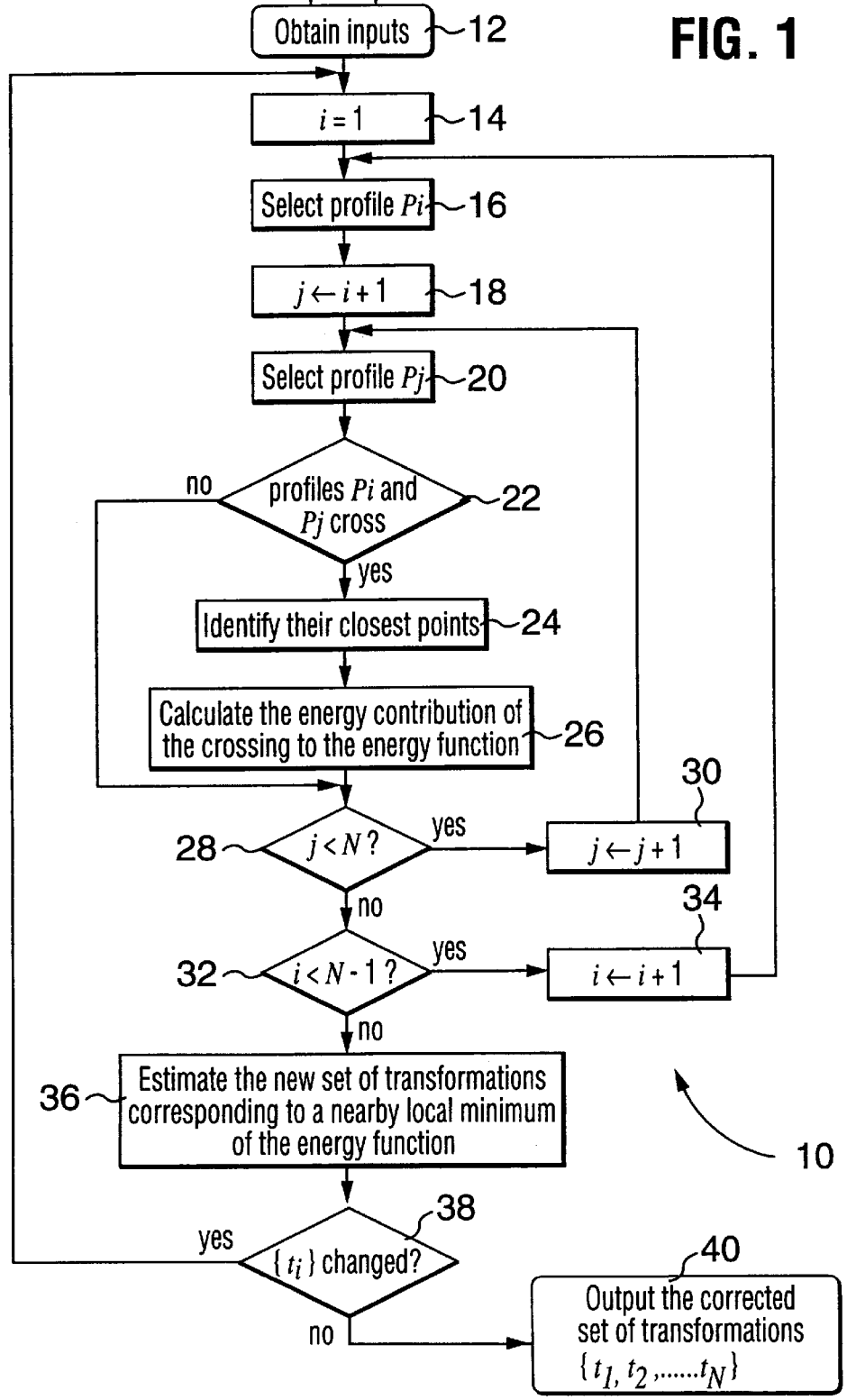
FIG. 1 illustrates a flow chart of the method of determining the spatial relationships of sets of range measurements obtained from a target surface according to the present invention.

FIG. 1 illustrates a flow chart of a method 10 for achieving a registration of surface profiles based on range measurements of a target surface.

Input Profiles

A set of N crossing profiles $P_i$ {$P_1, P_2, \ldots, P_n$} of an object 50 (FIG. 2) are obtained at step 12. The profiles $P_i$ are obtained by a ranging sensor 52 that is moved to a plurality of positions relative to a global reference frame $R_g$ to cover a region 54 of interest of the object 50. Alternatively, a plurality of fixed sensors 52 can be positioned around the object 50 to cover the region of interest 54. In the most general sense, a profile is a series of range coordinates taken along a line extending across the region of interest 54 of the object 50. The ranging sensor 52 in this application refers to any device that collects three dimensional coordinate data.

The profiles $P_i$ are each collected in a very short period of time and are considered a rigid entity. In addition, the region of interest 54 of the object 50 is preferably undeforming relative to the sensor 52 during the step of obtaining the profiles. Every profile $P_i$, among the N input profiles, is provided as a list of M range measurements in a sensor reference frame $R_{si}$ (FIG. 3):

$$P_i = \{(x_{i1}, z_{i1}), (x_{i2}, z_{i2}), \ldots, (x_{iM}, z_{iM})\}, \qquad (1)$$

where $(x_{in}, z_{in})$ is the $n^{th}$ range measurement on profile $P_i$ gathered in the coordinate system $R_{si}$ of the sensor 52. Each profile $P_i$ under consideration in the present embodiment is planar in $R_{si}$ (i.e. all y components are equal to 0, whereby x, z data are used to recover the object's 50 shape).

Alternative embodiments of the method 10 using other characteristic information such as intensity, color and temperature of the object 50 for either (a) improving the precision of the method 10 or (b) to apply the method 10 when ambiguities in the geometry of the observed object 50 occur, such as when scanning a planar surface (e.g. an image or text on a sheet of paper) will be discussed below.

Estimate Spatial Relationship

A measurement or estimate of the associated spatial relationship (i.e. position and orientation) of the profiles $P_i$ relative to the sensor reference frame $R_{si}$ is obtained at step 12 and is defined by a parameter vector $t_i^k$.

More specifically, each profile $P_i$ is associated with the vector $t_i^k$ for describing the spatial relationship between $R_{si}$ and the origin of $R_g$. The vector $t_i^k$ is a 6 component parameter vector as defined below:

$$t_i^k = [x \ y \ z \ \phi \ \theta \ \psi]^t, \qquad (2)$$

where (x, y, z) represent translation parameters and ($\phi, \theta, \psi$) represent rotation parameters. The rotation parameters ($\phi, \theta, \psi$) follow a predetermined rotation convention such as roll, pitch and yaw angles. Index k is used to identify a time step in the method 10.

From the vector $t_i^k$ a 4×4 matrix describing the homogeneous transformation $T_i$ (see FIG. 2) can be formed:

$$T_i = T(t_i^k) = \begin{bmatrix} c\phi c\theta & c\phi s\theta s\psi - s\phi c\psi & c\phi s\theta c\psi + s\phi s\psi & x \\ s\phi c\theta & s\phi s\theta s\psi + c\phi c\psi & s\phi s\theta c\psi - c\phi s\psi & y \\ -s\theta & c\theta s\psi & c\theta c\psi & z \\ 0 & 0 & 0 & 1 \end{bmatrix} \quad (3)$$

In the matrix $T_i$ (equation 3), c and s stand for cos and sin respectively. Therefore, $c\phi s\theta$ is a compact notation for $\cos \phi \sin \theta$.

Profile Adjustment

Index variable i is set to 1 at step 14 to establish an initial gross estimate of the parameter vector for sequentially processing the profiles $P_i$ obtained in step 12. Profile $P_i$ is selected at step 16. Index variable j is set to i+1 at step 18. Profile $P_j$ is selected at step 20. Step 22 determines if the two selected profiles $P_i$ and $P_j$ cross each other.

Figure 3:
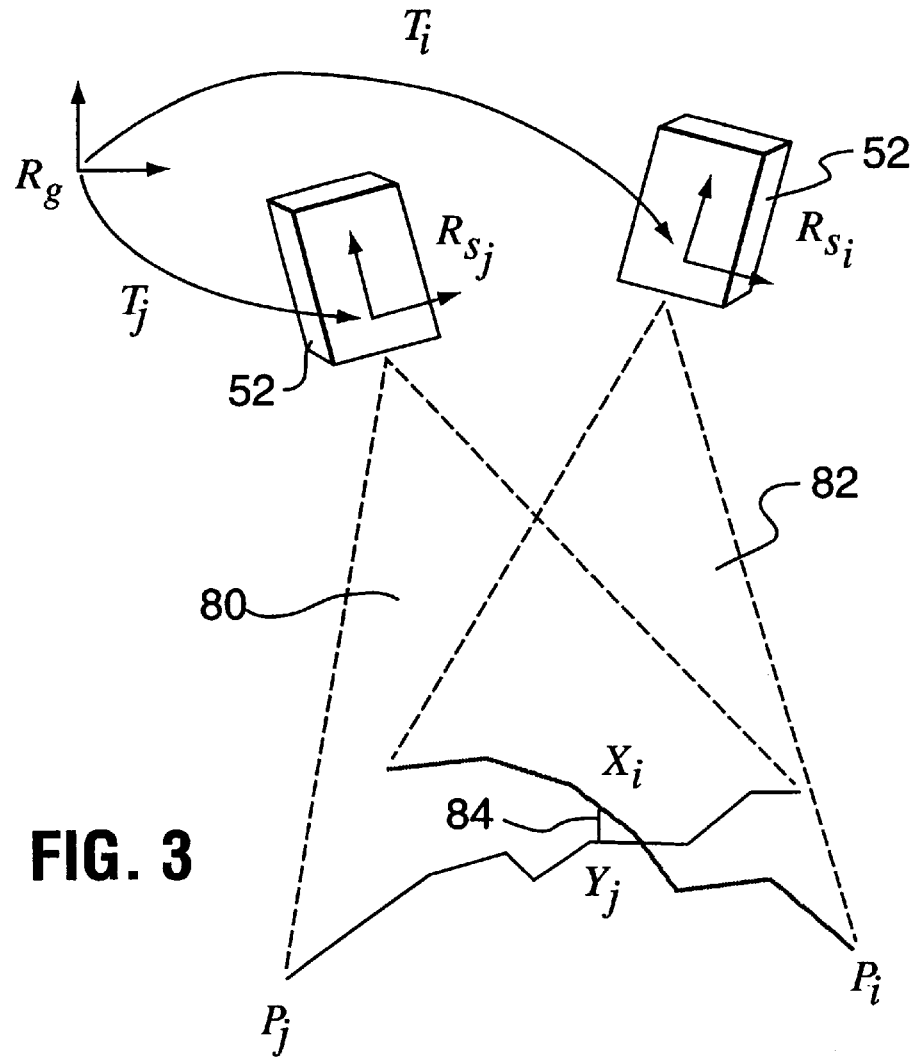
FIG. 3 illustrates a schematic representation of two crossing profiles.
Figure 4:
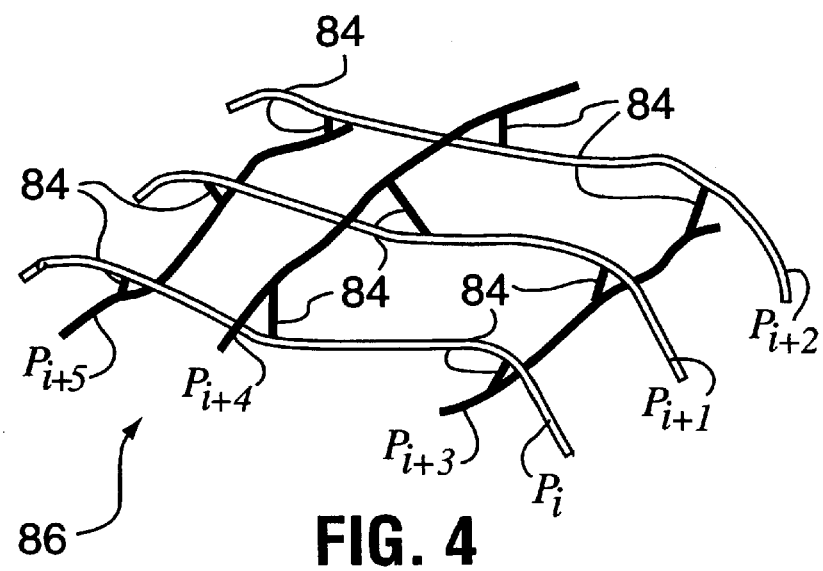
FIG. 4 illustrates a schematic representation of a crossing profile grid.

Two profiles cross if their bounded scanning planes intersect, as illustrated in FIG. 3. A scanning plane 80 from sensor 52 at position $R_{sj}$ intersects a scanning plane 82 from sensor 52 at position $R_{si}$. Since the vectors $t_i^k$ are not exact, the two profiles $P_i$, $P_j$ cross each other but do not necessarily intersect or touch at a common point. This is illustrated in FIG. 4, where the profiles $P_i$ cross without touching (i.e. intersect at a common point) as illustrated by distance vectors 84, to form a crossing profile grid 86.

If it is determined at step 22 that the profiles $P_i$ and $P_j$ do not cross then processing advances to step 28 where the index variable j is compared to N (the total number of profiles). If j is less than N, index variable j is incremented by one at step 30 and processing returns to step 20. If j is greater than or equal to N, processing advances to step 32 in which variable i is compared to N−1.

If i is less than N−1, variable i is incremented by one at step 34 and processing returns to step 16. If i is greater than or equal to N−1 processing advances to step 36 to estimate a new set of transformations as discussed in more detail below.

If it is determined that the two profiles $P_i$ and $P_j$ cross over each other (but not necessarily intersect each other) processing advances to step 24 to determine their closest points of intersection.

A crossing location of two profiles $P_i$ and $P_j$ is constituted by the two closest points on both profiles that minimize the Euclidean distance $d_{ij}^k$ between the two profiles:

$$d_{ij}^k(t_i^k, P_i, t_j^k, P_j) = \min_{n,m} \left\| T(t_i^k)[x_{in}\ 0\ z_{in}\ 1]^t - T(t_j^k)[x_{jm}\ 0\ z_{jm}\ 1]^t \right\| \quad (4)$$

Figure 5:
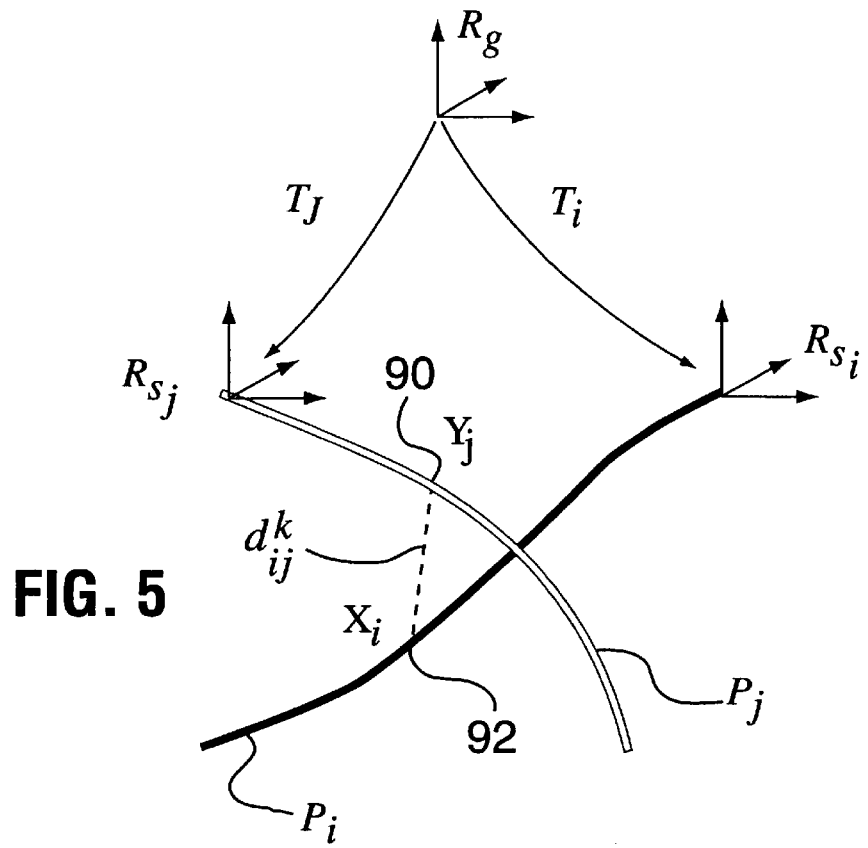
FIG. 5 illustrates a schematic representation of a fixed point formulation calculation of the energy contribution of two crossing profiles to the energy function of the system.

To simplify the expression for $d_{ij}^k$, let $X_{ij}^k$ and $Y_{ij}^k$ be the crossing points of $P_i$ and $P_j$ at time step k on $P_i$ and $P_j$ respectively:

$$d_{ij}^k = \|X_{ij}^k - Y_{ij}^k\| \quad (5)$$

at each crossing location, the distance $d_{ij}^k$ measures the lack of fit or energy "stored" in a pair of crossing profiles. FIG. 5 provides a schematic representation of equation 5. By summing the individual energy contribution of each of the crossing profiles of the entire profile grid 86 an "energy function" (also known as an error or objective function) can be determined.

A set of displacement transformation parameters $\{\Delta_i\}$ for all $P_i$ are determined to minimize the energy function at step 36. The problem is formulated by writing the predicted contribution for every crossing after a given displacement. The two types of formulations are fixed point and sliding profile as discussed below.

Fixed Point Formulation

The fixed point formulation is based on the Euclidean distance between two crossing points as shown schematically in FIG. 5. The following equation applies when the two intersecting profiles ($P_i$, $P_j$) are able to move relative to each other (the method 10 attempts to mimimize the distance between fixed anchor points 90 and 92):

$$z_{ij} = \|T(\Delta_i)x_{ij} - T(\Delta_j)y_{ij}\|, \quad (6)$$

where $\{\Delta_i\}$ is a set of relative transformations.

The energy function $\Phi$ is defined as the sum of all profile crossing contributions:

$$\Phi(\Delta_1, \Delta_2, \ldots, \Delta_N) = \sum_{i=1}^{N} \sum_{j+1}^{N} z_{ij}^2 \quad (7)$$

For two profiles $P_i$ and $P_j$ that do not cross, $z_{ij}^2$ is equal to 0. There is no contribution to the energy function in that case. The set of relative transformations $\{\Delta_i\}$ that minimize the energy function $\Phi$ is calculated as discussed below.

Many other traditional mathematical alternatives to the squared distance law can be used in the fixed point formulation including the L1 and robust norms.

Sliding Profile Formulation

Figure 6:
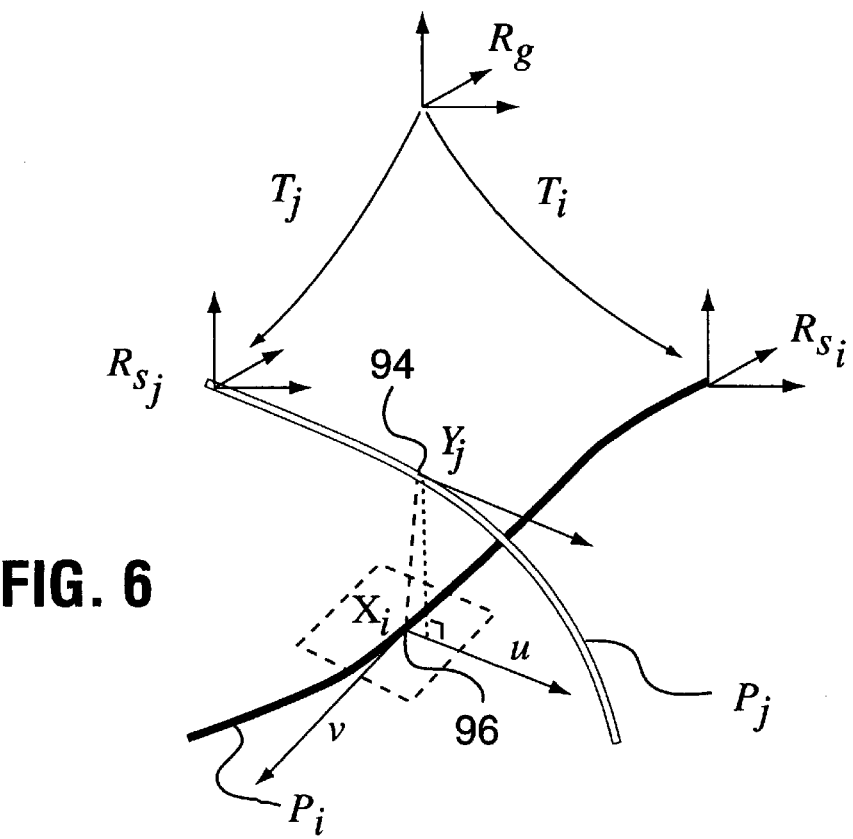
FIG. 6 illustrates a schematic representation of a sliding profile formulation calculation of the energy contribution of two crossing profiles to the energy function of the system.

In the sliding profile formulation the profiles $P_i$ and $P_j$ can slide along each other where point 94 is fixed and point 96 is slidable, as schematically represented in FIG. 6. The expression of the distance and the prediction change relative to the fixed point formulation but the system has the same general form.

$$d_{ij}^k = A_{ij}^t Y_{ij} \quad (8)$$

$A_{ij}$ is a tangent plane vector $[A_x A_y A_z]^t$ evaluated at $x_i$. The normal vector $A_{ij}$ of the tangent plane is the cross-product of the two tangent vectors u and v along each profile at the intersection points as shown schematically in FIG. 6. This leads to the following measurement prediction:

$$z_{ij} = A_{ij}^t T(\Delta_i)^{-1} T(j) Y_{ij} \quad (9)$$

Minimization

In both the fixed point (FIG. 5) and the sliding profile formulation (FIG. 6), the energy function $\Phi$ of equation 7 is solved using classical methods for optimizing a multi-dimensional nonlinear function. Among them, the Levenberg-Marquardt method is used to efficiently find a local minimum of the function $\Phi$. This method requires the computation of the first derivatives of the function $\Phi$ with respect to the parameters ($\Delta_1, \ldots, \Delta_n$). Details of this method is provided in W.H. Press, et al. *Numerical Recipes in C: The art of scientific computing*. Cambridge University Press, Second edition, 1992, which is incorporated therein by reference.

The computed incremental transformations are then composed with the current transformations for update:

$$t_i^{k+1} \leftarrow T(\Delta_i) T(t_i^k) \quad (10)$$

At step 38 the parameter vector $t_i^k$ is compared with its previous values to determine if there was a change. If $t_i^k$ changed then processing returns to step 14 until $t_i^k$ stabilizes.

This occurs when the energy function Φ essentially returns approximately the same value in multiple iterations. The energy function Φ decreases rapidly with iterations.

Output Transformation

The set of parameter vectors $\{t_i^k\}$ can also be considered to be a "corrected" set of parameter vectors based on the initial gross estimate of the parameter vectors provided prior to processing at step 2. The set of parameter vectors $\{t_i^k\}$, produced at step 40 after stabilization, is used to compute a representation of the corrected shape of the target surface 54 of the object 50. The most simple representation is a list of all points in $R_g$. This list can be obtained by transforming all points $x_{in}$, of profiles $P_i$ from $R_{si}$ to $R_g$ using the corrected or new transform $t_i^l$:

$$x'_{in} = T(t_i^k) x_{in} \quad (11)$$

where $x'_{in}$ is the transformed point.

Alternative Embodiments and Applications

Figure 2:
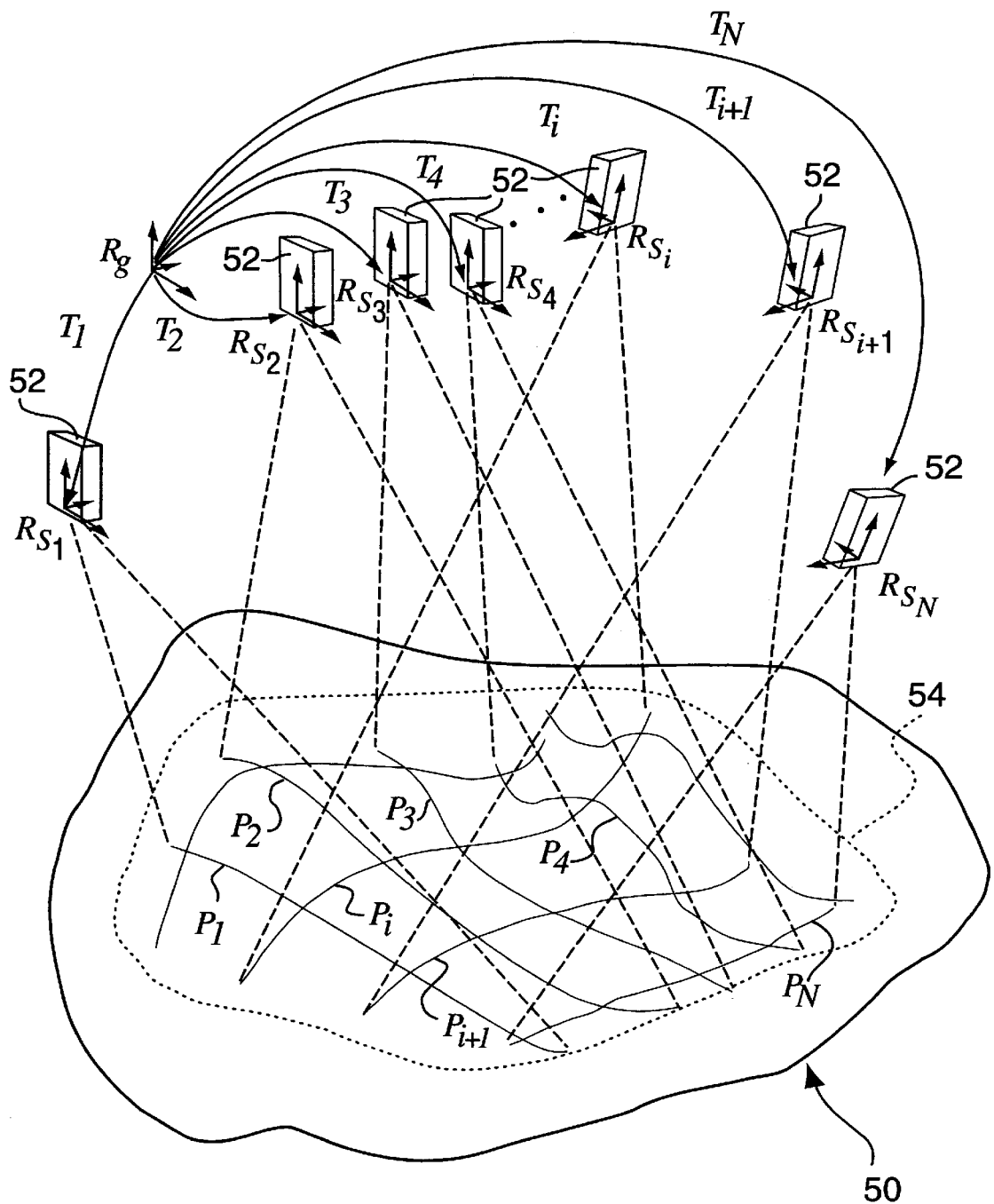
FIG. 2 illustrates a schematic representation of a ranging sensor obtaining a plurality of crossing profiles from an object.

The method 10 can be applied in the most general application when no global positioning device is available. The object to be studied is placed on a table. The user holds a profile scanner and sweeps the surface of the object with a series of nearly parallel profiles. Then, a second series of parallel profiles is gathered at a predefined angle (for example 90 degrees) while covering approximately the same area of the object as shown in FIG. 2. Other additional series of profiles can also be gathered at predefined different angles for more accuracy.

Based on the crossing series of profiles, the object area is constrained and from the known, but approximated, relative angles between profile sets, sensor transformations can be initialized to uniformly cover the scanned area. The intensity at each profile point can be used as an additional component to the profile geometry. These additional intensity profiles may improve accuracy provided the intensity at a given point is relatively stable.

Specifically, the range sensor measures the distance between a target area and the sensor but in addition, it measures the intensity scattered back from the object's surface using technics known in the art such as described in U.S. Pat. No. 4,658,368, issued Apr. 14, 1987 directed to a peak portion detector, which is incorporated therein by reference. Therefore, each x,z coordinate is associated with an intensity measurement that can provide useful information for a smooth surface (e.g. a plane such as a sheet of paper). The initial x,z profile is thereby enhanced with an associated intensity profile.

Figure 7:
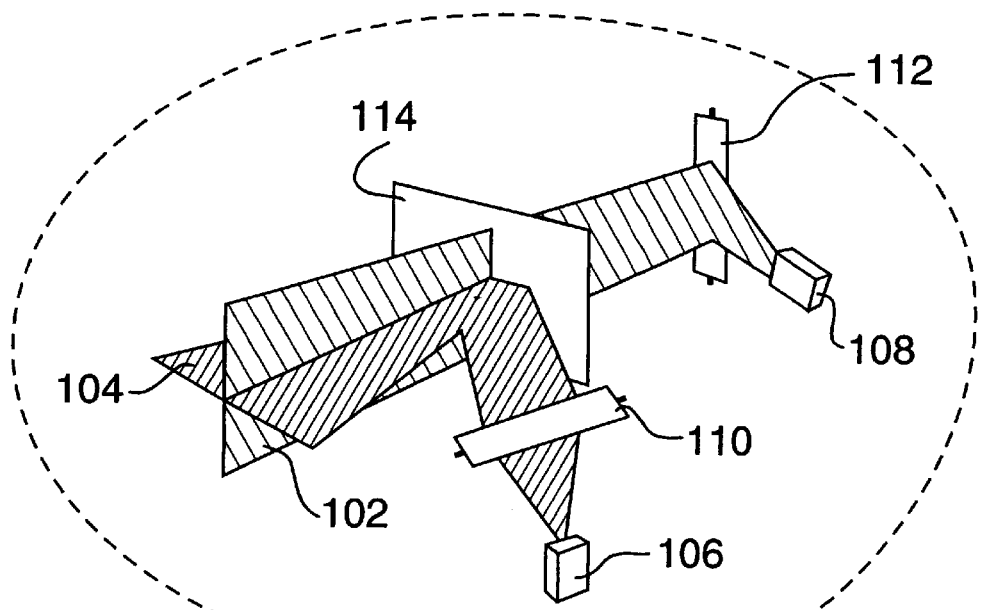
FIG. 7 illustrates a portable 3D camera capable of projecting two different wavelengths to automatically establish the crossing profiles required for the method described in FIG. 1.

A ranging sensor in the form of a portable 3-D camera 100 that incorporates a vertical 102 and a horizontal 104 scanning plane is shown in FIG. 7. The horizontal and vertical planes 102, 104 are projected at two different wavelengths to avoid interferences between the two sets of profiles. The camera 100 includes a pair of laser profile scanners 106, 108 and a pair of pivoting mirrors 110, 112. A dichroic mirror 114 is used to project simultaneously both scans in registration. Using the mirror angular position associated with each profile, initial estimates of the relative transformations between profiles are directly available. Moreover, since a vertical profile is simultaneously collected with a horizontal profile, crossing sets of two profiles are collected. The number of profiles to register is thereby reduced by 50% and there can be two intersections between two crosses. This improves stability in the energy function Φ when the method 10 is applied.

Figure 8:
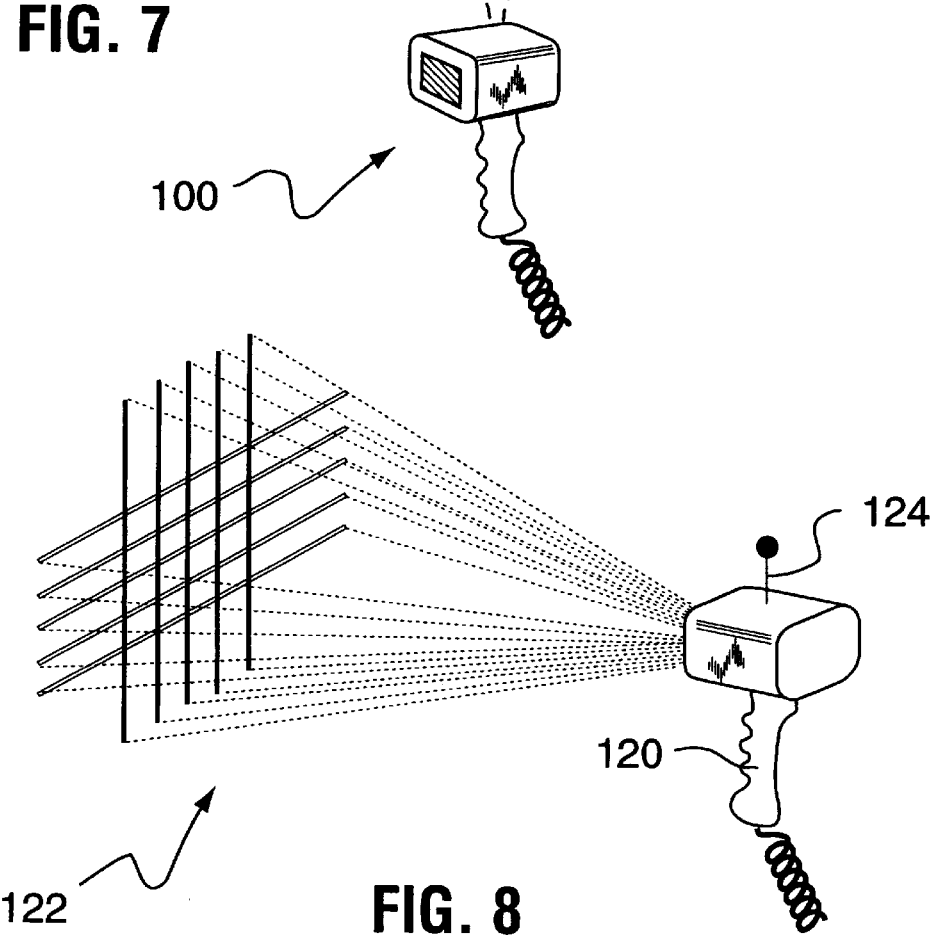
FIG. 8 illustrates a 3-D camera for integrating continuously 3-D views by generating a family of profiles consisting of a series of vertical and horizontal profiles.

A 3-D camera 120 for integrating continuously 3-D views is shown in FIG. 8. The camera 120 generates series or family of vertical and horizontal profiles (five such profiles are shown in each of two sets in FIG. 8) that are projected simultaneously on the surface to be studied. The projected light forms a rigid grid network 122. The horizontal and vertical profiles are projected at two different wavelengths to avoid interference. A global positioning or relative positioning device 124 is mounted on the sensor. The sensor is used like a "spray painting" device to capture a target. The network of stable camera range measurements are used to lock together for the set of N last image grids. Applying the method 10 as the set of N last image grids is preferred in continuous acquisition where a large amount of grids are measured.

Figure 9:
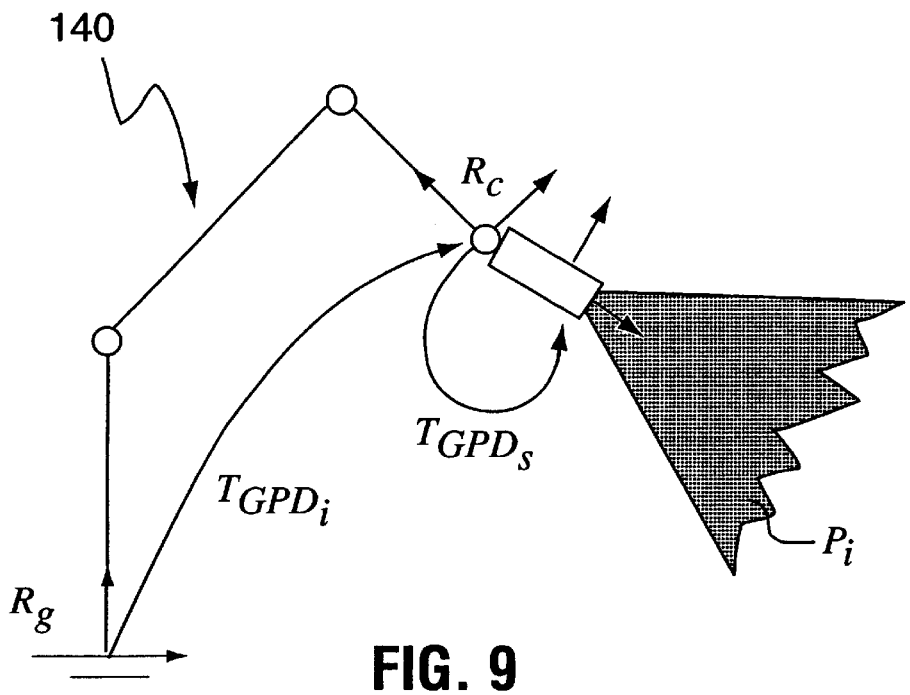
FIG. 9 illustrates a calibration system for estimating the transformation between a sensor reference frame and a tracking arm.
Figure 10:
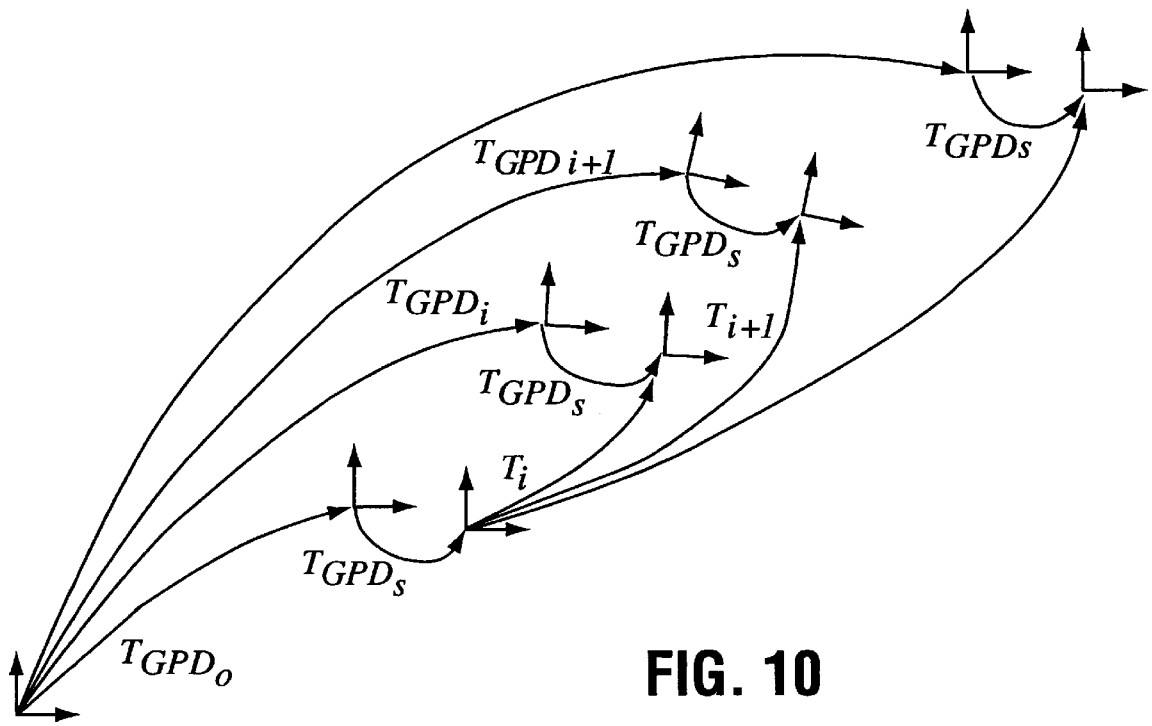
FIG. 10 illustrates a schematic representation of the transformations used in the calibration system of FIG. 9.

The method 10 of the present invention can also be used as a calibration solution for estimating the transformation between a sensor reference frame $R_c$ and a global positioning device (GPD) such as a tracking arm 140 as illustrated in FIGS. 9 and 10. Since the method 10 of the present invention corrects the measured shape and solves for the relative sensor positions, one can use a set of "off-the-shelf" objects, place them on a table and collect a series of profiles using the sensor along with the GPD. While collecting each profile, the transformation reported by the GPD is also recorded. Using these transformations and the set of relative transformations between sensor positions resulting from the output of the method 10, a set of equations can be stated where each has the following form:

$$T_{GPD_0} T_{GPD_s} T_i = T_{GPD_i} T_{GPD_s} \quad (12)$$

In equation 12, $T_{GPO_o}$ is the transformation matrix provided by the GPD for the reference profile used as a global referential while applying the method 10. $T_{GPD_i}$ is the transformation matrix provided by the GPD for profile $P_i$.

$T_{GPD_s}$ is the transformation matrix describing the spatial relationship between the GPD and the sensor reference frame. $T_{GPD_s}$ is constant but unknown. These transformations are illustrated schematically in FIG. 10. Each additional sensor position provides an equation of the same form (equation 12). Based on the resulting set of equations, the parameter vector leading to $T_{GPD_s}$ can be estimated. Details of this estimatation procedure are summarized below:

(1) Select one profile $P_o$ as a reference such that $R_g = R_{so}$ and apply method 10;

(2) Based on the physical assembly, provide an initial estimate for the parameters $t_{GPD_a} = (x\ y\ z\ \phi\ \theta\ \psi)$, as $t_{GPDa}^o$;

(3) For each different pair of profiles $P_{2i}$ and $P_{2i+1}$ calculate:

(a) $T_{GPD_i} T_{GPD_s}(t_{GPD_s}^o) T_i^{-1} T_{i+1} \rightarrow t_a$ (b) $T_{GPD_{i+1}} T_{GPD_s}(t_{GPD_s}^o)^{-1} t_b$ (c) $t_j\ \_t_a - t_b$, with $j = i/2$ when $i=0$, $T_0^{-1} = I_4$, where $I_4$ is the 4×4 identity matrix.

(4) Using the previously discussed Levenberg-Marquardt method, find $t_{GPD_s}$ that minimizes $$\phi_1 = \sum_{j=0}^{N/2} t'_j t_j.$$

Additional Data Considerations

In the general case, the information provided by the sensor 52 (and possible other integrated sensing systems) is decomposed into spatial (x, y, z), intensity (I), color (R, G, B) or other information ($\lambda_1$, $\lambda_2$, $\lambda_n$) (e.g temperature).

For a given profile, the information, whether geometric, photometric or other, can be seen as a parametric function in the form: g=F (u),
where u parameterizes the geometry of the profile.

For example, in the particular case of (x,z) profiles with recorded intensity, the components of F can be expressed as:

$f_1=x=f_1(x)=x$
$f_2=y=f_2(x)=0$
$f_3=z=f_3(x)$
$f_4=I=f_4(x)$

In this case a profile $P_i$ is a set of points ($f_1$, $f_2$, $f_3$ or equivalently x, y, z) and corresponding additional properties for each point ($f_4$, $f_5$, ... $f_n$).

Using additional information such as intensity does not change the basis of method 10. Points in affine space can be generalized from (x, y, z, 1) to (x, y, z, 1, $f_4$, ... $f_n$). By the same token, transformation matrices $T_i$ are augmented to $T_i^*$ such as not to modify properties after transformation:

$$T_i^* = \begin{bmatrix} [T_i] & \cdots 0 \cdots \\ \cdots 0 \cdots & [I_{n-3}] \end{bmatrix} \quad (13)$$

Matrix $I_{n-3}$ is the identity matrix of dimension n−3. Using additional properties such as intensity may improve precision of the recovered profile transformations, especially when the geometry of the observed surface is simple (e.g. 2D plane) while the intensity data contains more information (variations).

An example is the acquisition of profiles on a flat page with text and/or picture on it. In that specific case, a data point is expressed as:

(x, y, z, 1I), and the transformation matrix $T_i^*$ defined as:

$$T_i^* = \begin{bmatrix} [T_i] & 0 \\ & 0 \\ & 0 \\ & 0 \\ 0000 & 1 \end{bmatrix} \quad (14)$$

We claim:

1. A method of determining spatial relationships of sets of range measurements obtained from a target surface, comprising:

(a) producing a set of profiles, each profile being a series of range co-ordinates collected along a single line extending across the target surface using a ranging sensor with at least a subset of the set of profiles crossing each other;

(b) detecting at the location of a crossing of two profiles the shortest distance between these profiles, such distance being a measure of an energy contribution between this pair of profiles;

(c) summing the energy contributions of a plurality of such crossing locations to generate an energy function; and (d) reorienting the profiles relative to each other to minimise the energy function.

2. The method according to claim 1, further comprising the step of computing a three-dimensional representation of the target surface using the reoriented profiles obtained at step (d).

3. The method according to claim 1, further comprising the steps of: determining intensity information of the target surface and combining the intensity information with the sets of range measurements.

4. The method according to claim 1, further comprising the steps of: determining colour information of the target surface and combining the colour information with the sets of range measurements.

5. The method according to claim 1, further comprising the steps of: determining temperature information of the target surface using a temperature sensor and combining the temperature information with the sets of range measurements.

6. The method according to claim 1, further comprising the step of computing a transformation matrix from the spatial relationships of the sets of range measurements to describe a further spatial relationship between a global position device and a reference frame of the ranging sensor.

7. The method according to claim 1, wherein said target surface does not deform relative to the sensor during step(a).

8. A method according to claim 1, wherein the set of profiles includes a first group of profiles that are substantially parallel to each other and a further group of profiles that are substantially parallel to each other, the profiles of the further group extending at an angle to the profiles of the first group.

9. A method according to claim 1, wherein steps (b), (c) and (d) are repeated at least once employing the profiles that were reoriented at the previous step (d).

10. A method of ascertaining the three-dimensional shape of a target surface, comprising:

(a) using a ranging sensor to produce a series of profiles, each profile being a series of range co-ordinates collected along a single line extending across the surface with some of the profiles crossing over others of the profiles;

(b) detecting at the location of a crossing of two profiles the shortest distance between these profiles, such distance being a measure of an energy contribution between this pair of profiles;

(c) summing the energy contributions of a plurality of such crossing locations to generate an energy function; and (d) reorienting the profiles relative to each other to minimise the energy function, the reoriented profiles together defining the three-dimensional shape of the target surface.

11. A method according to claim 10, wherein the series of profiles includes a first set of profiles that are substantially parallel to each other and a further set of profiles that are substantially parallel to each other, the profiles of the further set extending at an angle to the profiles of the first set.

12. A method according to claim 11, wherein said angle is approximately 90°.

13. A method according to claim 10, wherein the profiles are randomly arranged.

14. A method according to claim 10, wherein steps (b), (c) and (d) are repeated at least once employing the profiles that were reoriented at the previous step (d).

15. The method according to claim 10, wherein each energy contribution is proportional to the square of its corresponding distance.

16. The method according to claim 10, wherein each energy contribution is proportional to the cross-product of two tangent vectors along each profile at the crossing location.

17. Apparatus for ascertaining characteristics of a target surface, comprising:
   (a) at least one ranging sensor for producing a series of profiles of the target surface, each profile being a series of range co-ordinates collected along a single line extending across the target surface; and
   (b) means for:
      (i) detecting at the location of a crossing of two said profiles the shortest distance between these profiles,
      (ii) determining from this distance an energy contribution between this pair of profiles,
      (iii) summing the energy contributions of a plurality of such crossing locations to generate an energy function, and
      (iv) reorienting the profiles relative to each other to minimise the energy function.

18. Apparatus according to claim 17, wherein said ranging sensor includes means for generating simultaneously a pair of profiles crossing each other.

19. Apparatus according to claim 17, wherein said ranging sensor includes means for generating simultaneously a family of profiles crossing each other.

20. Apparatus according to claim 19, wherein the family of profiles includes two groups of profiles, the profiles within each group being substantially parallel to each other and the profiles of one group extending at an angle to the profiles of the other group.

21. Apparatus according to claim 20, wherein said angle is approximately 90°.

* * * * *